Figure 1:
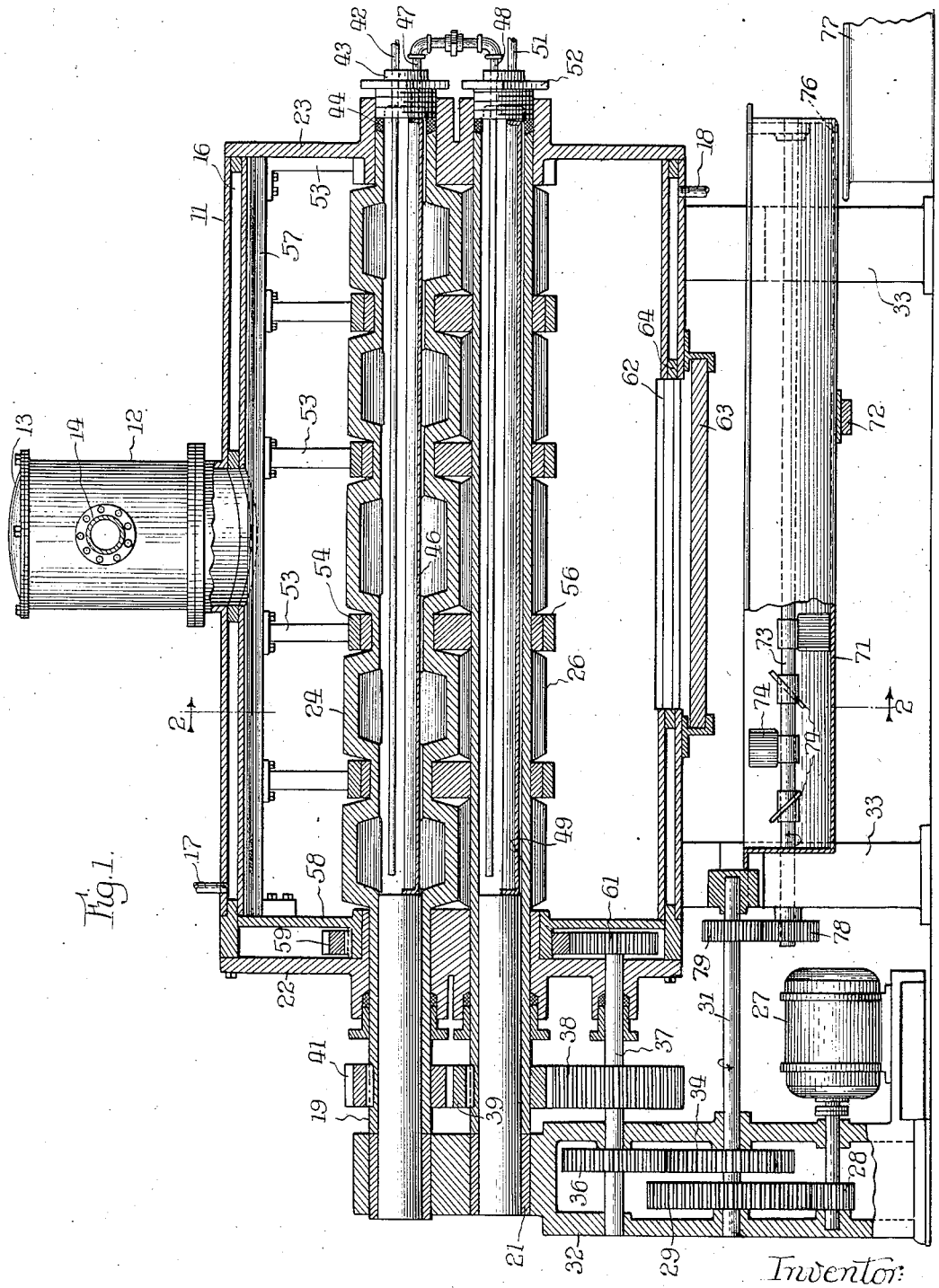

March 24, 1936.                L. A. MOLIN                2,035,090
                            COOKING APPARATUS
                          Filed May 20, 1932            2 Sheets-Sheet 2

Inventor:
Louis A. Molin,
By Mueller & McLaughlin
Attys.

Patented Mar. 24, 1936

2,035,090

UNITED STATES PATENT OFFICE 2,035,090

COOKING APPARATUS

Louis A. Molin, Chicago, Ill., assignor to Kling Brothers Engineering Works, Chicago, Ill., a corporation of Illinois Application May 20, 1932, Serial No. 612,435

6 Claims. (Cl. 87—13)

My invention relates in general to the rendering of fat and oil containing substances of animal origin.

A considerable industry has developed in utilizing animal products, many of which have no value for straight human consumption, for the recovery of valuable constituents therefrom, particularly fats and oils. As a rule, the processes involved produce two types of products, one constituting oleaginous constituents, and the other representing the residue usually termed crackling. The oleaginous constituent is utilized in any of the industries either in the form in which it is recovered or in a modified form and the purpose of the treatment is to recover as much of the oleaginous material as possible. The crackling or residue may be employed, depending upon its character, as fertilizer, as animal food and for other purposes.

In general, the first step of the recovery consists in preparing the animal material for the recovery of oil. This has been accomplished in a number of ways and the processes employed may be divided into wet processes and dry processes. In the wet process, the animal material was placed in a large tank to which live steam was directly fed for a sufficient length of time to break up the fibers and cells of the animal material and prepare it for the extraction of the oil. The process was objectionable because the steam would introduce additional amounts of moisture which had to be drained off and when drained off would carry large amounts of the protein material with it. After the removal of this liquid, the solid material had to be still further freed from moisture before it could be pressed for the removal of the fats and oils. The liquid then had to be treated for the separation of the oleaginous constituents from the aqueous constituents and the aqueous constituents then concentrated and the concentrate (which is called stick and contains about 45% proteins) had to be re-introduced into the crackling or residue from the pressing operation.

Recently the animal material has been treated to prepare it for pressing by the so-called dry method. In this method, no additional moisture is introduced into the animal material but it is treated to produce a final product containing between 7% and 10% of moisture which is the most desirable content for pressing. In carrying out the dry process, two procedures in general have been followed. According to one method, the animal material was thoroughly ground and was then introduced into an open tank where it was cooked for a sufficient length of time to drive off the excess moisture and produce a product satisfactory for pressing. This process has its advantages in that a good grade of crackling is obtained but it is objectionable in that expensive grinding equipment is required which adds greatly to the cost. Moreover, there are certain types of animal material which cannot be processed so satisfactorily by a method involving grinding.

In another type of dry process which is explained in Laabs' Patent No. 1,578,245, the animal material in relatively large pieces is placed in a closed container and heat is applied to the outside of the container usually by means of a steam jacket and a pressure of from ten to fifty pounds per square inch maintained on the inside of the container. This disintegrates the animal material, separating the fibers and disrupting the cells by internal pressure, usually after approximately three hours under a pressure of approximately forty pounds. At the end of this time, the container is opened to atmosphere and heating continued to drive off the greater portion of the moisture to leave a product suitable for pressing. Sometimes a pressure less than atmospheric is employed during this stage of the process to facilitate the removal of moisture. This process avoids the use of costly grinding equipment and is advantageous for the treatment of certain types of animal material. It is objectionable principally because an inferior grade of crackling is obtained and because a relatively heavy expensive tank must be employed to carry the requisite pressure.

The object of my invention is to improve on the processes heretofore employed in rendering fat and oil bearing material of animal origin.

Another object is to avoid all of the objectionable features disclosed in the preceding paragraphs.

Another object is the provision of a process which will produce a higher grade product than has been possible heretofore.

Another object is to save time and labor in the rendering of animal material to prepare it for the extraction of oils and fats.

Another object is to obviate the necessity of modifying the details of operation according to the nature of the product to be rendered.

Another object is the provision of improved rendering means adapted for a treatment of any type of animal material.

Another object is to obviate the use of highly trained labor which has been necessary in the operation of the internal pressure process.

In general, I accomplish my invention by disintegrating the animal material and evaporating the moisture therefrom in a single stage, thus avoiding a two stage method which has been necessary in every rendering process heretofore employed. I accomplish this in such a way that the maximum amount of oil may be recovered from the animal material and the crackling will be of the highest grade containing relatively long fibers and having all of the original protein material present in the most desirable form. In carrying out the process, I disintegrate the animal material by a crushing and shredding operation during cooking and at a pressure not greater than atmospheric pressure whereby moisture is driven out during the entire treatment.

Figure 2:
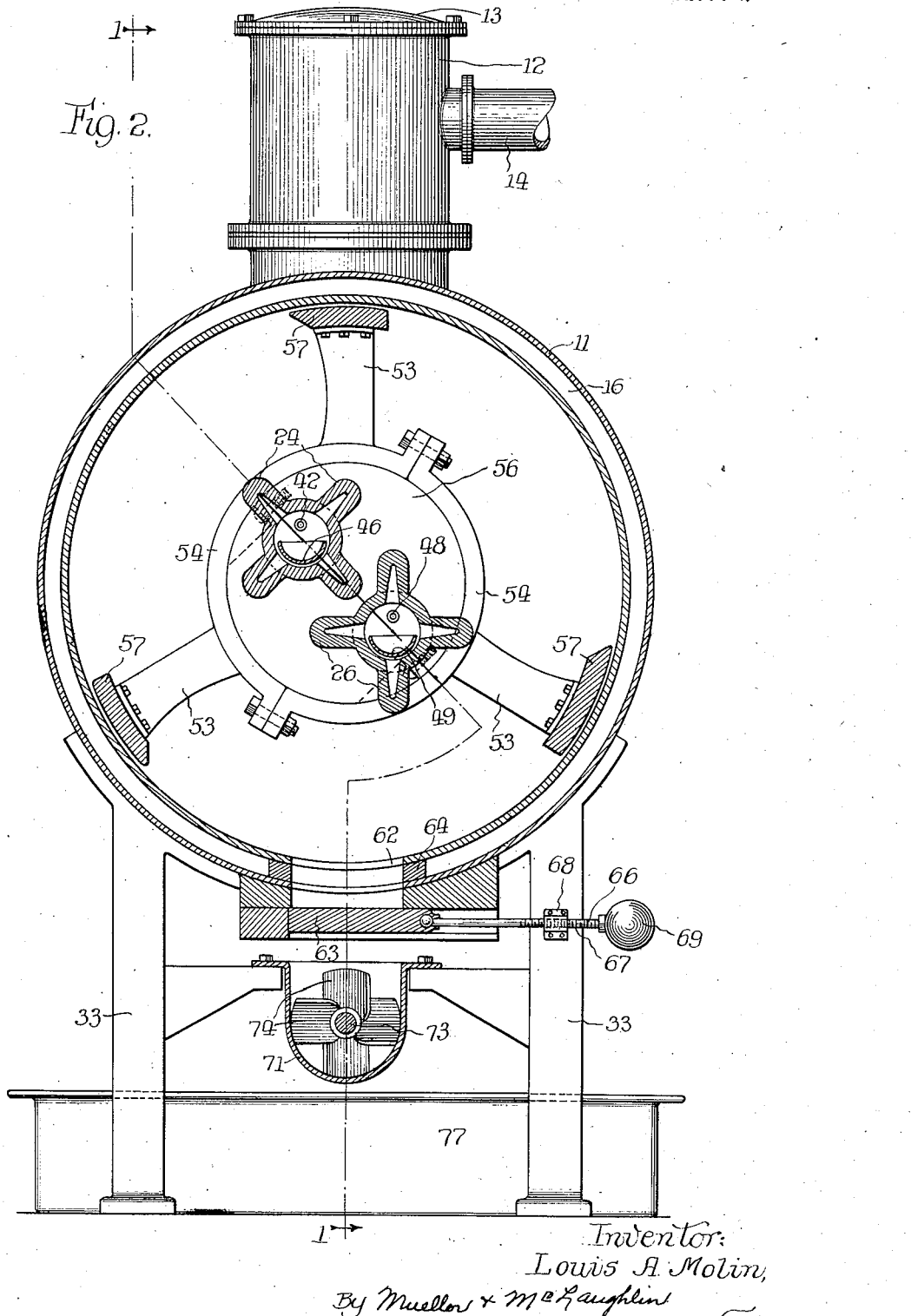

Other objects and features of the invention will be apparent from a consideration of the following detailed description taken with the accompanying drawings wherein Fig. 1 is a longitudinal, irregular, sectional view taken along the line 1—1 of Fig. 2. Fig. 2 is a sectional view thereof taken along the line 2—2 of Fig. 1.

I shall first refer to the drawings showing apparatus with which my method may be practiced. I employ a tank indicated generally by the reference character 11, having a charging dome 12 closed by a cover 13 and fitted with a pipe extension 14 for conveying moisture driven off from the tank to a suitable point of discharge. The animal material in relatively large aggregates if required may be charged through the charging dome 12 into the tank where it is treated to prepare it for pressing.

For an application of heat, I provide a steam space 16 formed by jacketing the main tank in a way understood in the art so that steam and suitable pressure may be utilized for heating the contents of the tank. I show a pipe 17 at the upper part of the jacket for introduction of the steam and a pipe 18 at the bottom of the jacket and at the opposite end thereof for removal of the steam or condensate thereof.

The animal material is treated mechanically while heat is being applied to it to facilitate the disrupting of the cells and the breaking apart of the fibers. The mechanical treatment does not necessarily involve grinding but rather a pressing and shredding operation which leaves the fibers relatively long but still accomplishes a sufficient rupture thereof to prepare the material for pressing in a relatively short period of time.

One means for accomplishing this mechanical treatment is shown in the drawings. A pair of shafts 19 and 21 journalled in the end plates 22 and 23 of the rendering tank are provided with mutually co-acting crushing paddles 24 and 26 respectively. The shafts are set so that the paddles overlap each other but the paddles themselves are arranged approximately 45 degrees apart (when four paddles are employed on each shaft) so that they will pass each other. By rotating the shafts slowly the relatively large pieces of animal material are squeezed between the paddles to facilitate disruption but there is no grinding action which will cut up the fibers.

For rotating the shafts 19 and 21, I provide a suitable source of power such as a motor 27 having a pinion 28 keyed on its shaft. Pinion 28 meshes with a gear 29 on a shaft 31, the shaft 31 being journalled in an upright gear frame 32 and also in one of a pair of supports 33 for the tank. The shaft 31 also carries a gear 34 meshing with a somewhat smaller gear 36 on a shaft 37. Shaft 37 carries a gear 38 meshing with a gear 39 on a shaft 21 and this gear in turn meshes with a gear 41 on a shaft 19. It is clear therefore that shafts 19 and 21 rotate in opposite directions when the motor 27 is in operation.

To obtain the most satisfactory heating characteristics, I find it desirable to heat the tank from the inside as well as from the outer jacket. To this purpose the shafts 19 and 21 as well as the paddle assemblies are made hollow to permit the introduction of steam thereto at suitable pressure. Looking at Fig. 1, steam is admitted through a pipe 42 extending through a packing nut 43 which holds packing 44 in such a way as to prevent steam leakage. The steam is delivered into the hollow shaft 19 by the pipe 42 preferably near the far side of the shaft so that there will be no doubt of steam reaching the entire hollow space and being well distributed therein. I find that there will be some condensation of steam, particularly when the tank is first placed in operation and so I provide a long narrow drain pan 46 within the shaft, secured against rotation and adapted to convey condensate to exhaust pipe 47. This pipe 47 connects with the supply pipe 48 leading to the lower hollow shaft 21 and this hollow shaft is also provided with a stationary drain 49 for conveying condensate back to a return pipe 51. As in the case of the hollow shaft 19, so the shaft 21 is also provided with a packing nut 52 through which the pipes 48 and 51 pass.

I also provide means for imparting continuous agitation to the contents of the cooking tank and also to scrape the sides of the tank to avoid the possibility of any material becoming lodged against the sides and remaining there during the entire treating period. For this purpose, I provide a plurality of agitating paddles 53 forming a part of ring members 54 which are journalled on split bearings 56 surounding the shafts 19 and 21 between the crushing paddles. The bearings 56 are split as indicated at line A and suitably bolted together to retain them around the shafts 19 and 21. Scrapers 57 are secured to the outer ends of the agitating paddles and are in relatively close proximity to the inner tank wall.

At one end of the tank, the scrapers 57 are secured to a plate 58 which closes off one end of the tank. Suitable packing is provided around the movable plate 58 to prevent moisture from leaking around the plate to the gears secured on one side thereof. This plate has secured thereto a ring gear 59 which gear meshes with and is driven by a pinion 61 carried on the shaft 37. This affords a continuous drive for an agitator during the entire time that the mechanism is in operation.

The bottom of the tank is provided with an opening 62 adapted to be closed by a sliding closure member 63. A spacer 64 extending around the opening 62 seals off the two sections of the tank so that there is no loss of steam from the steam jacket through the opening 62. The closure 63 is operated by a rod 66, the end of which is rotatably supported in the closure. A part of this rod is provided with threads 67 adapted to engage in a threaded opening in a bracket 68 whereby after the closure member has been pushed in by means of the hand piece 69, the rod is threaded into the bracket 68 to force the closure member tightly in place and avoid leakage. When the material has been treated fully in the tank 11, the closure member 63 is opened and the contents of the tank are allowed to fall by gravity into a trough 71 supported below the tank. This trough is provided with a suitable strainer 72 so that oil which is in a liquid condition may be strained out from the solid material.

For removing the material from the pan 71, I provide a conveyor including a shaft 73 with a plurality of paddles 74 so set as gradually to move the material toward an opening 76 in the pan 71 whence it is delivered into a suitable crackling pan 77. The shaft 73 carries a gear 78 meshing with a gear 79 on the shaft 31. Suitable clutch mechanism may be provided as those skilled in the art will understand or the conveyor may be operated directly as shown in the drawings.

Those familiar with the treatment of animal material to recover the fat therefrom will understand the method employed in the operation of the machine from a consideration of the preceding description. In general, it might be stated however, that I may charge the tank initially with relatively large pieces of animal material, in fact, any size which will be accommodated by the charging dome 12. The crushing paddles and agitator may be operated during the charging to facilitate distribution of the material throughout the entire tank. After the charging, the dome cap 13 is replaced, steam is admitted to the jacket and to the interior of the crushing paddles. During the operation of the mechanism, the material is carried around by the agitator, some of it being dropped between the crushing paddles which are arranged at an angle as shown in Fig. 2. After a short time, during which heat and mechanical manipulation of the animal material takes place, all of this material will be reduced substantially to a pulpy homogeneous condition. Thereafter completing the cooking and driving off of the excess moisture until approximately 7% to 10% moisture is present in the material is aided by the crushing paddles particularly in assisting in removing oil and moisture which is entrapped in the meat fiber. The agitator continues to be of considerable value in keeping the material in motion and facilitating the liberation of moisture therefrom.

When the material has been processed sufficiently to permit the extraction of the oil readily by the application of pressure, closure 63 is drawn back to allow the material to drop into the pan 71. Here the oily constituents are strained through the strainer 72 and the solid constituents move on to the crackling pan 77, whence they are treated in the usual way. Those skilled in the art are referred to my co-pending application, Serial No. 589,382, filed January 28, 1932, wherein I disclose an oil extracting mechanism which may be used very satisfactorily with the cooking mechanism herein described.

The advantages flowing from the use of the mechanism of my invention and by the use of my improved method are of great value. It is clear that in the present process, disintegration and evaporation take place simultaneously. Moreover, due to the arrangement of the crushers, a greater heating surface is provided with a given size tank. The result of this increased heating surface is that with a given size tank, I can increase the capacity at least 100%. In the preceding processes, the manner of operation is varied for different products. In my method, however, every product may be treated in exactly the same way.

While I do not wish to limit myself in any respect in the speed in which the crushers are operated, I find that a very slow speed of from 5 to 10 R. P. M. produces very good results. The crushers break the bones up to suitable size, free the fats and continuously squeeze and break the meat fiber, not to a fine condition as when grinding is used but so as to produce a relatively long fiber. The crackling therefore is of the highest grade and the product very suitable for pressing.

With processes heretofore employed, suitable skilled labor is required because the heating must be stopped when the material has progressed to a proper condition. Either under-treatment or over-treatment is objectionable. At times over-treatment may be carried to such an extreme as to scorch the product and spoil an entire batch.

Tests have shown that when the moisture content has been decreased below approximately 15% there is a gradual rise in temperature. This makes it possible with the process of my invention to employ a thermostatic control by means of which the steam to the jacket and to the crushers may be shut off automatically when the moisture content is from 7% to 10%. At the same time a suitable signal may be actuated to inform the operator that the process has been completed.

What I claim is new and desire to protect by Letters Patent of the United States is:

1. The herein described mechanism for preparing material of animal origin for removal of oil by pressure, said mechanism comprising a tank having a charging dome through which relatively large pieces of animal carcass can be charged into the tank, means for closing said dome to seal the tank, a pair of spaced rollers in the longitudinal central portion of the tank having longitudinally extending projections, said projections and rollers spaced whereby to cause the projection of one roller to enter between a pair of projections of the opposite roller but out of contact with each other, means for rotating said rollers together whereby the relatively large pieces of animal carcass will be squeezed between the rollers but allow the bones of the carcass to pass therethrough, and means for applying heat to the material in the tank through said rollers whereby to assist in separating the animal material into individual fibers and to reduce the same to substantially a pulp condition.

2. Mechanism as defined in claim 1 including a plurality of supported paddles spaced radially around the axis of the tank and extending substantially the length thereof, and means for rotating said paddles whereby to remove relatively large pieces of carcass from the bottom of the tank and deliver the same to said crushing rollers.

3. Mechanism as defined in claim 1, including ring bearings surrounding said rollers and a paddle mechanism carried on said ring bearings and having paddles extending substantially to the outer periphery of the tank, and means for rotating said paddle mechanism within the tank whereby to cause the paddles to move pieces of carcass from the bottom of the tank and deliver the same to the crushing rollers in the central longitudinal portion of the tank.

4. The herein described mechanism for preparing material of animal origin for removal of oil by pressure, said mechanism comprising a substantially tubular, horizontally disposed steam jacketed tank, a charging dome at the top of said tank for inserting relatively large pieces of carcass therein, means for closing said charging dome, bearings supported in end walls of said tank, a pair of nodulated rollers journalled in said bearings having their ends projecting out of the tank, a source of power, a gear connection from said source of power to said rollers whereby to rotate the rollers in unison, a paddle mechanism surrounding said rollers and having paddles extending substantially the length of the tank and radially disposed therein, means for rotating said paddle mechanism whereby to withdraw pieces of carcass from the bottom of said tank and deliver the same to said rollers for crushing, said rollers being spaced whereby animal fibers are left substantially uncrushed, and means for introducing steam into the interior of said rollers and around said steam jacketed tank.

5. The herein described mechanism for preparing material of animal origin for the subsequent removal of oil by pressing, said mechanism including a cylindrical material containing tank having a horizontal axis, a steam jacket surrounding the tank, a pair of shafts extending through the tank longitudinally thereof, material crushing means carried by said shafts, means for turning said shafts in opposite directions, a plurality of agitator paddles journaled on bearings carried by said shafts, scrapers secured to the outside ends of said paddles adapted to move adjacent the inside surface of the tank, means for imparting rotary movement to said paddles and scrapers as a unit, whereby material in the tank is agitated and solid material is removed from the bottom of the tank and delivered to said crushing means and means for discharging said crushed material from the tank.

6. The herein described mechanism for preparing material of animal origin for subsequent removal of oil by pressing, said mechanism including a substantially tubular, horizontally disposed steam jacketed tank, a charging dome at the top of said tank for inserting relatively large pieces of carcass therein, means for closing said charging dome, bearings supported in end walls of said tank, a pair of nodulated rollers journaled in said bearings having their ends projecting out of the tank, a source of power, a gear connection from said source of power to said rollers whereby to rotate the rollers in unison, a paddle mechanism surrounding said rollers and having paddles extending substantially the length of the tank and radially disposed therein, means for rotating said paddle mechanism whereby to withdraw pieces of carcass from the bottom of said tank and deliver the same to said rollers for crushing, said rollers being spaced whereby animal fibers themselves are left substantially uncrushed and means for discharging the crushed material from the tank.

LOUIS A. MOLIN.